July 25, 1961  G. M. J. VAN AKEN ET AL  2,993,502
HIGH PRESSURE STOP VALVE
Filed Sept. 23, 1957  2 Sheets-Sheet 2
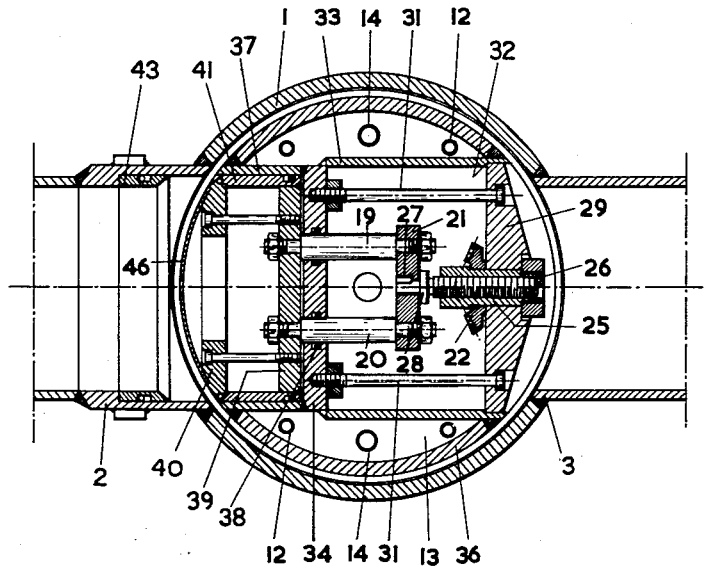
G. M. J. VAN AKEN
N. J. MOKVELD
INVENTORS
BY Wenderoth, Lind & Ponack
ATTys

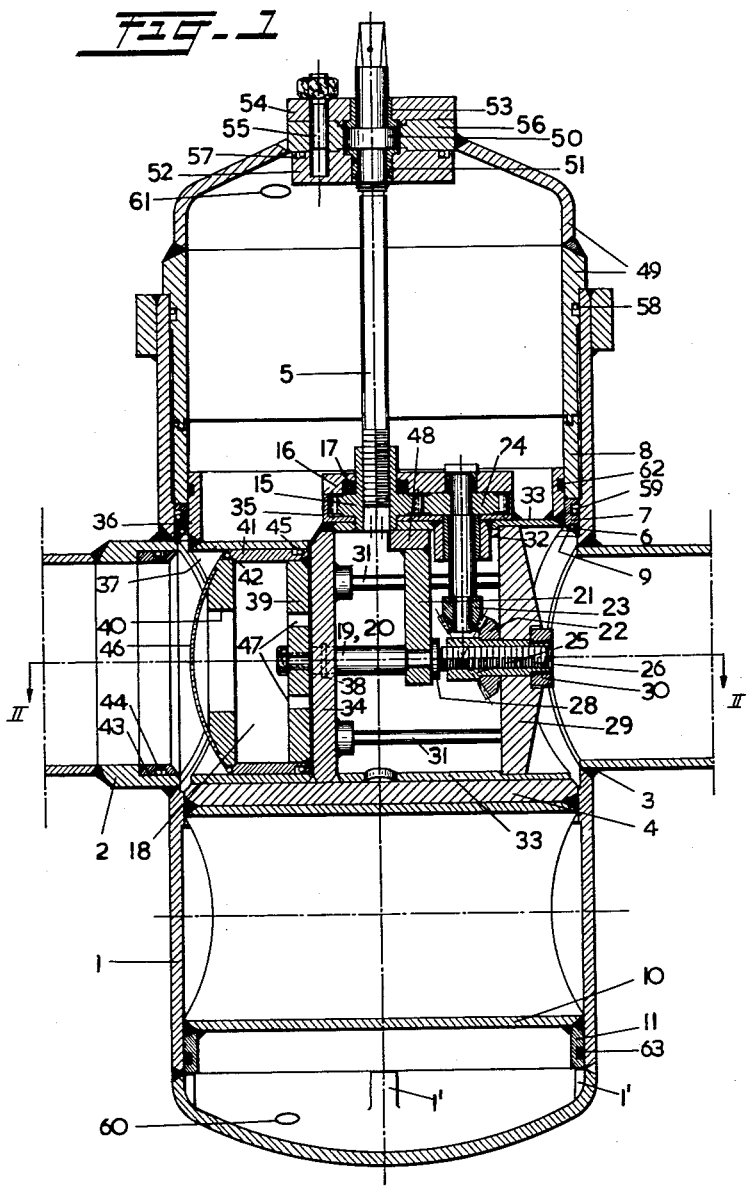

United States Patent Office 2,993,502
Patented July 25, 1961

2,993,502
HIGH PRESSURE STOP VALVE
Gerardus Mathias Johannes van Aken, Jan van Nassaustraat 117, The Hague, Netherlands, and Nicolaas Jacobus Mokveld, Jan Luykenstraat 5, Gouda, Netherlands
Filed Sept. 23, 1957, Ser. No. 685,575
Claims priority, application Netherlands Sept. 28, 1956
5 Claims. (Cl. 137—315)

This invention relates to a high pressure stop valve for use in e.g. gas conduits and oil conduits, on which valve special demands are made as regards its accessibility and keeping it in repair. Such valve should be able to be repaired without necessitating an interruption of the use of the conduit. The object of the invention is to provide an improved stop valve for this purpose.

According to the invention, the stop valve comprises a valve casing having two fluid flow orifices at opposite sides of the casing. A seating surface is positioned around at least one of the orifices, and a sealing element is provided within the casing for pressing on the seating surface around the orifice. The sealing element forms part of a closure mechanism which is mounted in the casing for movement transversely of the direction of flow between the two orifices. A chamber is provided on the casing into which this closure mechanism is movable during such transverse movement. The closure mechanism is mounted on a valve disc which is movable in the valve casing, and a seat is provided around the entrance to the chamber for the closure mechanism against which the valve disc seats when the closure mechanism is withdrawn into the chamber. The chamber is thus sealed off from the flow of fluid between the orifices and the closure mechanism and seating surface can be worked upon without leakage of the fluid.

The stop valve according to the invention is preferably so constructed that the closure mechanism is provided with an actuating mechanism comprising a gear transmission, an internally threaded terminal gear of which is mounted for axial movement on a screw spindle forming the actuating shaft, which spindle upon being turned in the "valve open" direction will axially displace both the terminal gear, after said gear has been blocked by the closure mechanism when it has reached the fully withdrawn position, and the closure mechanism to withdraw said gear and mechanism from the conduit. Furthermore a blocking means movable together with the valve means is adapted to prevent the relative movement of the gear mechanism until, when the screw spindle is turned in the "valve closed" direction, the terminal gear thereon has again reached its final position, in which case the closure mechanism has been moved back into the conduit in the position in which said closure mechanism is adapted to close the conduit. With the closure mechanism accommodated in a sealed space it is possible to admit fluid behind the valve means, so that the pressure of the fluid will be exerted on both sides of said valve means which in consequence need not be moved against the fluid pressure.

In addition thereto the stop valve according to the invention has the advantage that it provides a flow passage area which does not cause pressure losses, while due to the possibility of separating the closure mechanism from the unvalved connection formed in the casing and sealed off from the upper portion of the valve casing all parts of the stop valve can be interchanged, without it being necessary to take the conduit out of use. Consequently it is not necessary to build in expansion pieces for removing the stop valve, there is no loss of gas by venting or deaeration during replacement of valve parts, while standardized parts of the stop valve can be kept on stock and can be easily interchanged.

Several variations in the construction of the stop valve are possible. Thus the valve disc may be kept pressed on its seat by mechanical means, e.g. by means of bolts or the like, while the valve may be a single or double-acting valve.

In the accompanying drawing which is by way of example:
FIG. 1 is a vertical sectional view on the plane through the axis of the conduit and the axis of the valve casing of the stop valve according to the invention; and
FIG. 2 is a sectional view on line II—II of FIG. 1.

The stop valve shown in the drawing has a valve casing 1 comprising a connecting branch 2 and an opening 3, said branch 2 and opening 3 being located opposite sides of casing 1 from each other, in which valve casing a closure mechanism is movable transversely of the conduit which the valve is to control, which closure means is mounted on one side of a valve disc 4. When the mechanism has been withdrawn from between branch 2 and opening 3 by means of the threaded spindle 5, valve disc 4 will bear on the valve seat 6 secured in the valve casing by means of the ring 7 and the cylinder 8 threaded into said casing, which seat is provided with a flexible sealing ring 9. The cylinder 8 defines a chamber into which the closure mechanism is movable. The valve disc 4 is formed integral with intermediate conduit piece 10 which when the closure mechanism has been withdrawn provides an unrestricted flow passage between the branch 2 and the opening 3 respectively and which is accommodated in a cylindrical portion 11 fitting in the lower closed portion of the valve casing. Due to the pressure of the fluid in the conduit, which pressure is admitted to the lower portion of the valve casing when the valve disc 4 is pressed against seat 6, 9 when the closure mechanism is in the withdrawn position a hermetic seal is produced between cylinder 8 and conduit piece 10 so that it is possible to take the mechanism out of the valve casing, for which purpose the valve disc 4 is detachably connected by means of bolts 12 with the bottom 13 of an inner casing accommodating the actuating and closure mechanism. The accurate assemblage of the valve disc relative to the inner casing is achieved by dowels 14.

An internally threaded gear 15 having an axial extension is mounted on the threaded spindle 5 for axial displacement by relative rotation, which gear has a fixed position relative to the inner casing of the closure mechanism due to the provision of a closure plate 16 and a thrust bearing 17, so that axial displacement of the gear 15 relative to the threaded spindle 5 will also entail the displacement in said direction of the closure mechanism. The rotation of the threaded spindle will result in said axial displacement as soon as the gear 15 is blocked from rotating along with the spindle by the composite valve means having arrived in a fully withdrawn position, which valve means is connected by rods 19, 20 and the bridging piece 21 with the spindle 26 threaded through an axially fixed internally threaded sleeve 25 which is adapted to be rotated by means of the gear 15 through the bevel gears 22, 23 and the straight gear 24, said spindle 26 itself being secured from rotation by the screw 27 and being fixed in the bridging piece 21 by means of a threaded end and a collar 28 threaded thereon. The bridging piece 21, in the same manner as the valve means 18, is rigidly secured to the rods 19, 20 by means of nuts.

The internally threaded sleeve 25 carrying the gear 22 is rotatably supported in the disc 29, the nut 30 and the gear 22 on the sleeve 25 holding sleeve 25 against axial movement.

Screws 31 draw the separately mounted disc 29 tightly against an internal collar 32 on a cylinder wall 33, which is welded to the bottom 13 of the inner casing which for that purpose is provided with a central recess, the screws 31 being threaded into the disc 34 located opposite the disc 29, which disc 34 is welded to the cylinder wall 33. The cylinder wall 33 and the discs 29, 34 in this manner form a closed inner chamber which is rigidly mounted on the bottom 13 of the inner casing.

At the upper side of said inner chamber a structural part 35 is welded to the cylinder wall 33, in which structural part 35 are recesses for the accommodation of the gears 15, 24 and on which structural part the closure plate 16 is secured by means of screws, not shown.

The inner casing also includes the vertical cylinder wall 36 welded to the bottom 13 and to the cylindrical chamber wall 33, and includes the horizontal cylinder wall 37 welded to the disc 34 as well as to the wall 36 and the bottom 13, which cylinder wall 37 together with the disc 34 forms the valve chamber. In the cylinder wall 36 openings are provided corresponding with the cylinder walls 33 and 37 respectively for the passage therethrough of the valve means 18 on the one hand and the parts of the closure mechanism on the other hand. The cylinder wall 36 has an external diameter corresponding to the internal diameter of the valve seat retaining ring 7 and the retaining cylinder 8, while in the cylinder wall 36 as well as in the lower cylinder wall 11 felt rings 62 and 63 are provided for sealing against dust.

The rods 19, 20 are slidable in openings in the disc 34 through sealing rings 38. The rods are secured to the disc 39 of the valve means 18 by nuts. The valve means further comprises the cylinder 41 welded to the disc 39 and to a disc 40, the disc 40 and the cylinder forming an accommodation for the sealing ring 42 which is adapted to be pressed onto the seating ring 43 in the branch 2 by the valve means 18. Between the seating ring 43 and the wall of the branch 2 a sealing ring 44 is mounted in a ring groove, and in a similar manner a sealing ring 45 is provided between the cylinders 41 and 37. The disc 40 has a central opening through which the fluid may enter the interior of the valve means 18 through a sieve 46 secured to the disc 40, and from said interior it may pass through openings 47 in the disc 39 to behind said disc, so that the valve means 18 is substantially pressure-balanced.

During the closing or opening movement of the valve means by means of the control rods 19, 20 the bridging piece 21 moves along with said rods. The bridging piece 21 has on its upper side a locking member 48 which, when the disc 39 moves against the disc 34, so that further rotation of the gears is prevented, releases the screw spindle 5, so that said screw spindle can enter the interior of the inner chamber and the closure mechanism can be threaded upwardly along the spindle 5. Conversely the locking member 48 will block the valve means and thus the gears from relative movement as long as the threaded spindle 5 has not been entirely backed out of the inner chamber and the closure mechanism has not yet come into the position suitable for closing the valve. The threaded spindle 5 causes the gear 15 to rotate due to mutual friction as soon as the mechanism cannot move any further in the direction of the threaded spindle axis because of the valve disc 4 coming up against the seat 6, 9 or because the cylinder portion 11 has moved against the abutments 1' in the lower portion in the stop valve casing 1.

The valve casing 1 has on the upper end a cap member 49 screwed into the casing, in the upper end of which member are provided bearing and locking means for the threaded spindle 5, which spindle at that point is provided with a collar 50 holding it against axial displacement, which bearing and locking means 51, 52 and 53, 54 are kept together by bolts 55, which bolts are located on either side of the disc 56 welded to the cap member 49.

In order to enable the closure mechanism to be removed from the valve casing the cap member 49 can be unscrewed. In a groove in the cap member 49, just as in the retaining ring 7, sealing rings 58 and 59 are provided.

At the lower and at the upper ends the valve casing is provided with connecting openings 60 and 61 for the supply or discharge of fluid pressure by way of auxiliary conduits provided with stop valves that are not shown. Fluid under pressure may be admitted to the valve casing through said auxiliary conduits from the conduit being valved or from a separate source to keep the disc 4 pressed against the seat 6, 9 or fluid may be discharged from the upper or lower space of the valve casing during the displacement of the mechanism.

It is also possible to keep the disc 4 pressed against the seat 6, 9 solely by means of mechanical devices e.g. threaded rods, which pass through packing bushings into the casing 1 from below the casing and which, passing through the interior of the cylinder 11 along the cylinder 10, press against the disc 4.

We claim:
1. A stop valve mechanism comprising a valve casing, two fluid flow orifices at opposite sides of said casing, a seating surface around at least one of said fluid flow orifices, a closure mechanism movably mounted within and guided by said casing transversely of the direction of flow as defined by said orifices, said closure mechanism being provided with at least one sealing element for pressing on said seating surface, means movably mounted within and guided by said casing and defining a fluid flow passage spaced from said closure mechanism and connecting said orifices when said mechanism has been transversely moved from between said orifices, said valve casing having a chamber into which said closure mechanism is transversely movable, a valve disc to one side of which said closure mechanism is detachably connected and to the other side of which said means defining said fluid passage is connected, and a seat provided in said casing between said orifices and said chamber into which the closure mechanism is movable and against which said valve disc seats upon registry of said passage and said orifices.

2. A stop valve mechanism as claimed in claim 1 in which said closure mechanism comprises an actuating mechanism having a gear transmission for moving said one sealing element toward and away from said seating surface.

3. A stop valve mechanism as claimed in claim 2 in which said closure mechanism further comprises a terminal gear for said gear transmission, a threaded actuating shaft on which said terminal gear is threaded to bring about said transverse movement of the closure mechanism upon turning of the actuating shaft, and means for blocking said terminal gear from movement relative to said shaft in one transverse end position of the closure mechanism.

4. A stop valve mechanism as claimed in claim 3 in which said blocking means is movable together with said sealing element, whereby relative movement of the sealing element and gears is permitted in said one tranverse end position of the closure mechanism only.

5. A stop valve mechanism comprising a valve casing, two fluid flow orifices at opposite sides of said casing, a seating surface around at least one of said fluid flow orifices, a closure mechanism movably mounted within and guided by said casing transversely of the direction of flow as defined by said orifices, said closure mechanism being provided with at least one sealing element for pressing on said seating surface, said valve casing having a chamber into which said closure mechanism is transversely movable, a valve disc to one side of which said closure mechanism is detachably connected, and a seat provided in said casing between said orifices and said chamber into which the closure mechanism is movable and against which said valve disc seats when said mechanism has been moved transversely from between said orifices.

References Cited in the file of this patent

UNITED STATES PATENTS

| | | |
|---|---|---|
| 2,187,838 | Penick | Jan. 23, 1940 |
| 2,265,175 | Kinzie | Dec. 9, 1941 |
| 2,780,233 | Volpin | Feb. 5, 1957 |
| 2,851,768 | Ellis | Sept. 16, 1958 |